(12) United States Patent
Lolli et al.

(10) Patent No.: US 10,748,052 B2
(45) Date of Patent: Aug. 18, 2020

(54) APPARATUS AND METHOD FOR MAKING ANTENNAS FOR RADIO-FREQUENCY IDENTIFYING DEVICES

(71) Applicant: FABELE-S.R.L., Modena (IT)

(72) Inventors: Claudio Lolli, Castelnuovo Rangone (IT); Silvio Lolli, Castelnuovo Rangone (IT); Marcello Lolli, Castelnuovo Rangone (IT)

(73) Assignee: Fabele-S.r.L. (IT)

( * ) Notice: Subject to any disclaimer, the term of this patent is extended or adjusted under 35 U.S.C. 154(b) by 308 days.

(21) Appl. No.: 15/736,890

(22) PCT Filed: Jun. 16, 2016

(86) PCT No.: PCT/IB2016/053561
§ 371 (c)(1),
(2) Date: Dec. 15, 2017

(87) PCT Pub. No.: WO2016/203413
PCT Pub. Date: Dec. 22, 2016

(65) Prior Publication Data
US 2018/0174016 A1    Jun. 21, 2018

(30) Foreign Application Priority Data
Jun. 17, 2015   (IT) .......................... 102015000024870

(51) Int. Cl.
*H01Q 17/00*  (2006.01)
*G06K 19/077*  (2006.01)
(Continued)

(52) U.S. Cl.
CPC ..... *G06K 19/07773* (2013.01); *H01F 41/082* (2016.01); *H01Q 1/2216* (2013.01);
(Continued)

(58) Field of Classification Search
CPC ...... H01F 41/082; H01Q 1/2216; H01Q 7/00; H01Q 1/2208; H01Q 1/36; G06K 19/07773
See application file for complete search history.

(56) References Cited

U.S. PATENT DOCUMENTS

| 5,606,488 A | 2/1997 | Gustafson |
| 5,649,352 A | 7/1997 | Gustafson |

(Continued)

FOREIGN PATENT DOCUMENTS

| EP | 1793326 A2 | 6/2007 |
| WO | 9116718 A1 | 10/1991 |

(Continued)

*Primary Examiner* — Paul D Kim
(74) *Attorney, Agent, or Firm* — Laubscher & Laubscher, P.C.

(57) ABSTRACT

A method and apparatus for making an antenna for a radio-frequency identification device uses a forming device that rotates around an axis and includes shaping elements movable in a direction parallel to the rotation axis. A guiding device including a guiding element is movable in a direction substantially perpendicular to the rotation axis relative to the shaping elements of the forming device go guide a flexible wire or braided wires around the shaping elements to shape the wire in the form of an antenna. At least one gripper on the forming device immobilizes a free end of the wire. The antenna is laid on and connected with the upper surface of a substrate.

15 Claims, 7 Drawing Sheets

(51) Int. Cl.
*H01Q 1/22* (2006.01)
*H01F 41/082* (2016.01)
*H01Q 1/36* (2006.01)
*H01Q 7/00* (2006.01)

(52) U.S. Cl.
CPC ............ *H01Q 1/36* (2013.01); *H01Q 1/2208* (2013.01); *H01Q 7/00* (2013.01)

(56) References Cited

U.S. PATENT DOCUMENTS

| | | | |
|---|---|---|---|
| 5,665,931 A | 9/1997 | Washiyama | |
| 6,604,686 B1* | 8/2003 | Taban | G06K 19/07749 235/441 |
| 7,752,743 B2* | 7/2010 | Lolli | H01Q 1/38 29/33 M |
| 7,971,339 B2* | 7/2011 | Finn | G06K 19/07749 29/592.1 |
| 8,397,377 B2* | 3/2013 | Lolli | H01Q 1/38 29/33 M |
| 8,522,431 B2* | 9/2013 | Finn | G06K 19/07722 29/600 |

FOREIGN PATENT DOCUMENTS

| | | |
|---|---|---|
| WO | 2011098892 A1 | 8/2011 |
| WO | 2013093826 A1 | 6/2013 |

\* cited by examiner

APPARATUS AND METHOD FOR MAKING ANTENNAS FOR RADIO-FREQUENCY IDENTIFYING DEVICES

RELATED APPLICATIONS

This application is a § 371 of PCT/IB2016/053561 filed Jun. 16, 2016. PCT/IB2016/053561 claims priority of IT 102015000024870 filed Jun. 17, 2015. The entire contents of these applications are incorporated herein by reference.

BACKGROUND OF THE INVENTION

The present invention relates to an apparatus and a method for making antennas for radio-frequency identifying devices, commonly know as RFID transponders, provided with antennas formed of an electrically conductive wire, or of a braid of flexible wires, for example copper.

The term "flexible" is defined as a wire, or a braid of wires, that cannot maintain a stable configuration without being kept tensioned or without being fixed to a surface.

RFID transponders include two essential parts, the aforesaid antenna, made of electrically conductive material and an integrated circuit or microchip connected to the two ends of the antenna.

Making the antenna with a thin flexible wire made of electrically conductive material is known, for example a copper wire that is no more than 150 µm in diameter, connecting the ends to a module, also called a strap or interposer, which includes the integrated circuit or microchip.

Welding is necessary for HF band transponders whereas for UHF transponders the use of an antenna loop is known that includes the short range or near field integrated circuit that is readable at a close distance, to which a second antenna is added in the vicinity without a connection. The second antenna is coupled inductively with the integrated circuit to form a transponder operating long range or far field.

BRIEF DESCRIPTION OF THE PRIOR ART

In the prior art, methods and apparatuses are known for making antennas made of copper wire that form the antenna of the RFID transponders on a substrate. The wire is laid down and connected with the substrate used in the subsequent processes. Nevertheless, these methods and apparatuses take a long time for each production cycle as it is necessary to "make a pattern" of the antenna.

In fact, in order to lay down the wire on the substrate, known apparatuses include a plurality of heads, for example six or more heads, each of which is supplied by a coil of copper wire and lays down the wire on the substrate. These heads move, plotting with the wire the pattern of the antenna and connecting the wire to the substrate by a vibrating ultrasonic frequency hammer that follows the movement of the head. The substrate has to be of a material such as polyvinyl chloride (PVC) that softens with the heat generated by the vibrating hammer to retain the wire or has to be coated beforehand with a product that performs the same function.

The heads that are thus constructed are relatively complex and heavy mechanisms. One apparatus of the type mentioned above is disclosed in international patent application WO 2011/098892.

Forming a high frequency band antenna (HF or High Frequency 13.56 MHz) using a winding machine is also known, the shape of which is always made up of a spiral as disclosed for example in WO 91/16718.

From WO 2013/093826, an apparatus is known for making an antenna for a radio frequency identifying device, the antenna being made with a flexible wire or a braid of flexible wires made of electrically conductive material. The apparatus includes a forming device provided with shaping elements suitable for shaping the wire to obtain an antenna of preset shape, a guiding device provided with a guiding element for guiding the wire and at least one gripper device suitable for immobilising a free end of the wire.

In RFID transponders operating in the UHF (Ultra High Frequency) band, with a frequency variable from 860 to 960 MHz depending on the regulations of the various states, the antenna is never in the shape of a spiral but rather of a monopole, a dipole, of a circle formed by a single turn, or by a combination of the aforesaid shapes.

For reasons of space or efficiency, the normally rectilinear portions of the monopoles or dipoles can be curved to form bends or meanders.

In all cases, a UHF band antenna can never be manufactured using a winding machine.

SUMMARY OF THE INVENTION

The present invention provides an apparatus for making antennas with flexible electrically conductive wire such as copper wire, or a braid of flexible wires, both for HF band RFID transponders and for UHF band RFID transponders provided with an antenna made of electrically conductive wire.

In particular, the present invention provides an apparatus and a method that enables an antenna made of electrically conductive wire to be made completely before the antenna is laid on a substrate on which an RFID device is completed.

Owing to the invention, it is possible to make an antenna that is completely made of electrically conductive wire, for example of copper wire, both for HF RFID transponders and for UHF RFID transponders, without necessarily laying down the wire on a substrate during construction of the antenna, the antenna being connected with a substrate at the end of construction.

The antenna forming apparatus is simple to make and of reduced mass.

This enables very high productivity to be obtained, significantly greater than the productivity of known prior-art apparatuses owing to a cycle time for forming the antenna that is extremely reduced.

BRIEF DESCRIPTION OF THE FIGURES

Other objects and advantages of the invention will be described in the following specification with reference to the accompanying drawings, in which.

DETAILED DESCRIPTION

In FIGS. 1 to 14 a forming apparatus 1 according to the invention is shown by which it is possible to make antennas for UHF RFID devices.

Figure 1:
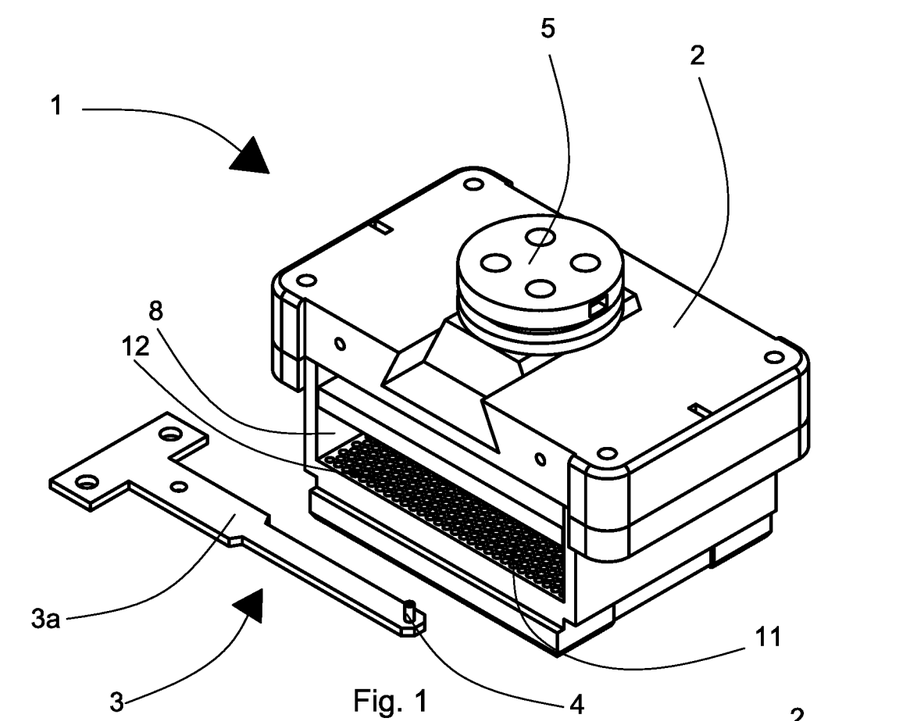
FIG. 1 is a schematic perspective view of a forming device for forming an antenna of the apparatus according to the invention.
Figure 2:
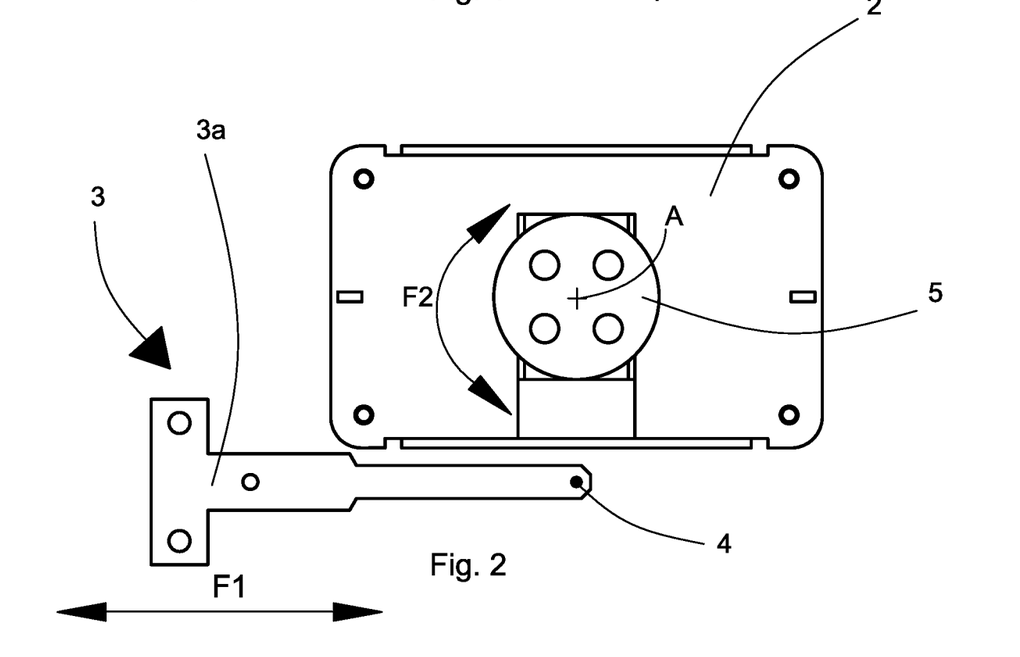
FIG. 2 is a top view of the device in FIG. 1.
Figure 3:
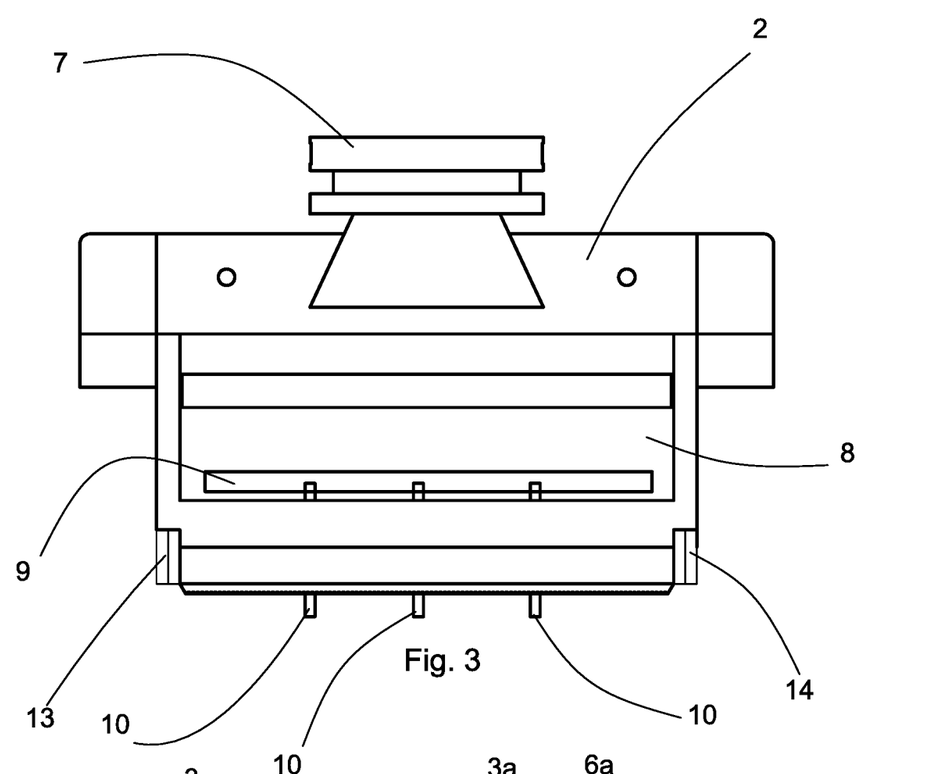
FIG. 3 is a raised view of the device in FIG. 1.
Figure 4:
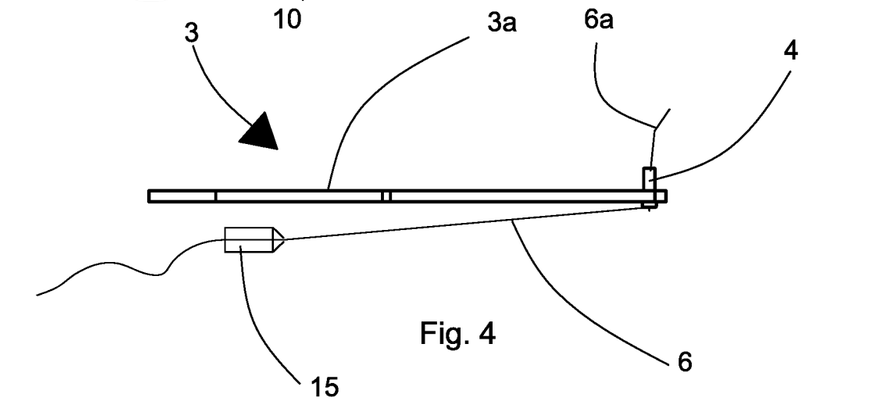
FIG. 4 illustrates a guiding device for guiding the electrically conductive wire that forms the antenna.
Figure 5:
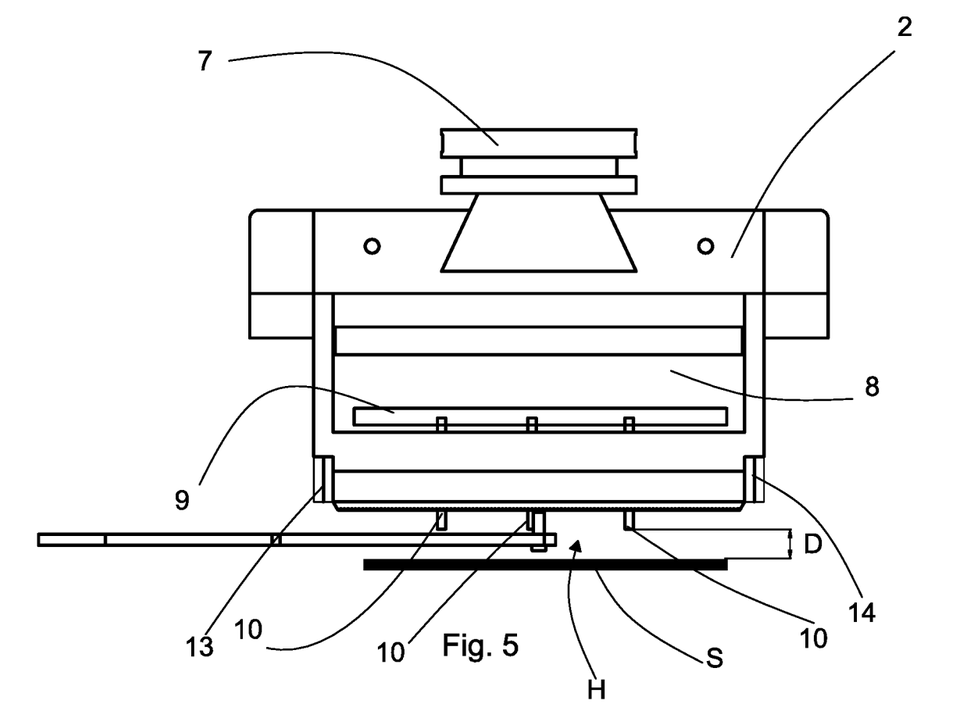
FIG. 5 is a raised schematic view of the forming device for forming the antenna and of the guiding device for guiding the wire during forming of the antenna.
Figure 6:
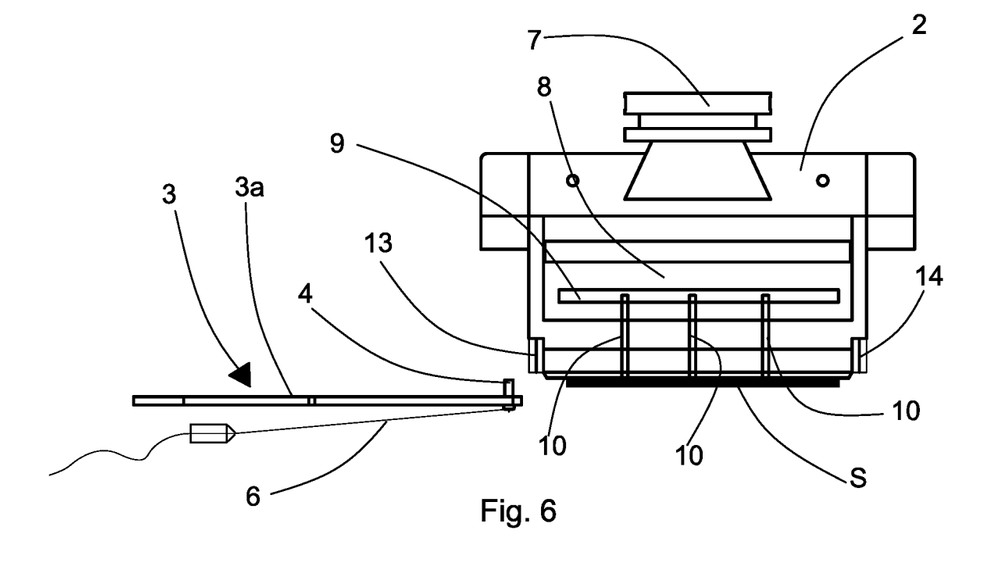
FIG. 6 is a view similar to FIG. 5, at the end of forming of the antenna, which illustrates laying down of the antenna on a substrate.
Figure 7:
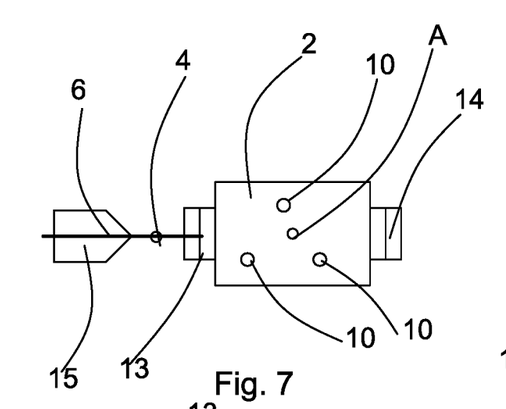
FIGS. 7 to 12 are schematic diagrams illustrating the respective steps of forming an antenna for an UHF RFID transponder.
Figure 8:
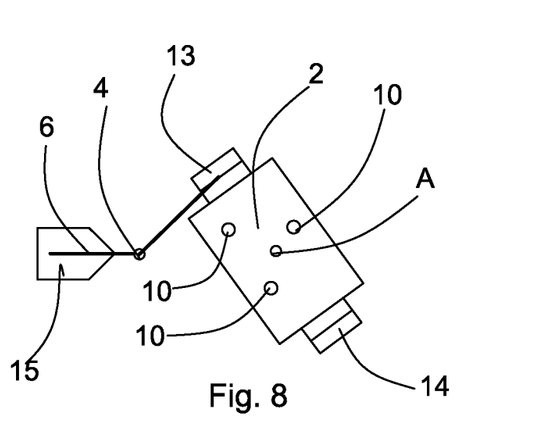
Figure 9:
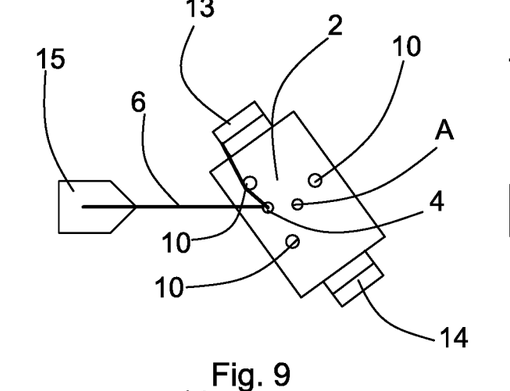

With reference to FIGS. 1 and 2, the apparatus 1 according to the invention includes a forming device 2 for forming an antenna and a guiding device 3 for guiding an electrically conductive wire with which the antenna is formed.

The guiding device 3 is movable in the direction of the double arrow F1 and includes a body 3a and a guiding element 4 (FIG. 4) that protrudes from the body 3a, for example a hollow cylindrical element arranged perpendicularly to the body 3a, inside which the wire 6 is passed such that it is guided during forming of the antenna.

The wire 6 is kept tensioned, during forming of the antenna by a tensioning device 15 which is part of the apparatus 1.

The forming device 2 is provided with a connecting flange 5 that can be connected to a driving device, not shown, for example a motor by which the forming device 2 can be rotated around a rotation axis A in the direction of the double arrow F2. The rotation axis A is substantially perpendicular to the direction of the double arrow F1.

The forming device 2 contains a cavity 8 inside which a supporting plate 9 is movable in a direction parallel to the rotation axis A. A plurality of shaping elements or rungs 10 is connected with the supporting plate to form the antenna in a desired shape. The number, shape and dimensions of the shaping elements 10 are variable depending on the shape of the antenna that it is desired to form. In FIGS. 1 to 14, purely by way of non-limiting example, three shaping elements 10 are shown.

The forming device 2 further includes a guiding plate 11, provided with a plurality of guiding holes 12 distributed, for example, over the entire surface of the guiding plate 11. The guiding holes 12 are used to guide the shaping elements 10 whereas the supporting plate 9 moves in the direction parallel to the rotation axis A. The supporting plate 9 is movable between a first visible lower position, for example in FIG. 5 in which the shaping elements 10 protrude below from the guiding plate 11, and a second visible upper position, for example in FIG. 6 in which the shaping elements 10 do not protrude below from the guiding plate 11. The supporting plate 9 remains in the lower position if an upper thrust is not exerted on the shaping elements 10.

The retention of the supporting plate 9 in the lower position thereof is due to elastic thrust elements that are not shown that push the plate to the lower position thereof or is due to the weight of the plate.

The forming device 2 is provided with a first gripper device 13 and with a second gripper device 14 that are used to immobilise a free end of the wire 6 during forming of the antenna.

Figure 13:
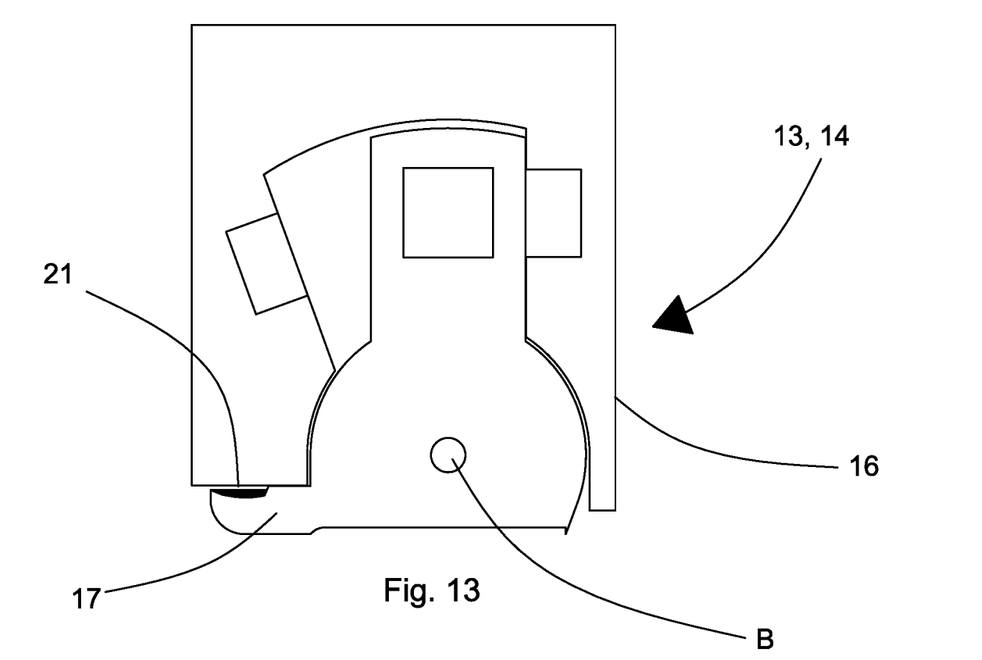
FIG. 13 illustrates a gripper element for gripping the forming device for forming the antenna in a closed position.
Figure 14:
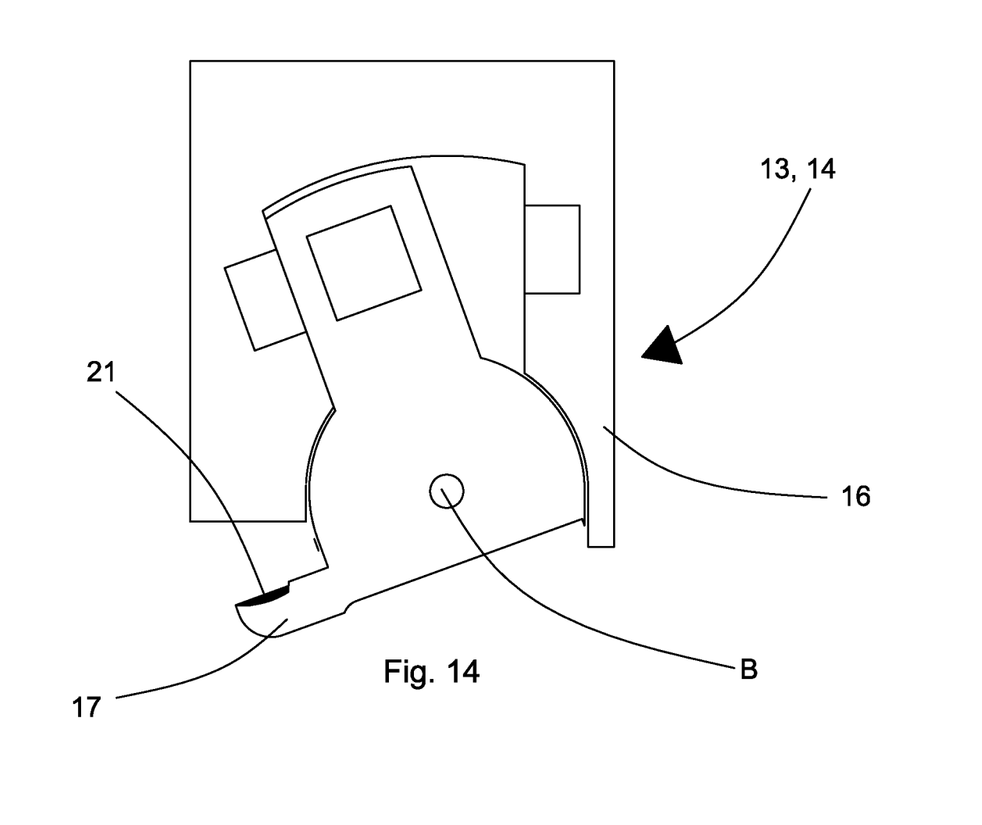
FIG. 14 illustrates the gripper element of FIG. 13 in an open position.

Each gripper device 13, 14 includes a fixed jaw 16, connected with the forming device 2 and a movable jaw 17 which can rotate around a rotation axis B with respect to the fixed jaw 16 between an open position illustrated in FIG. 14 and a closed position illustrated in FIG. 13 in which the wire 6 can be immobilised between the fixed jaw 16 and the movable jaw 17. The movable jaw 17 is provided with a cutting element 21 which is intended for cutting the wire 6 when the movable jaw 17 is taken to the closed position.

Forming an antenna with the apparatus 1 according to the invention, and the subsequent laying down and fixing the antenna on a substrate S is disclosed below in particular with reference to FIGS. 5 to 12.

The forming device 2 is placed near the substrate S such that the substrate S is at a distance D from the ends of the shaping elements 10 to enable the body 3a of the guiding device 3 to be inserted into the space between the substrate S and the ends of the shaping elements 10.

Subsequently, the wire 6 which is unwound from a coil that is not shown is passed into the tensioning device 15 and into the guiding element 4 of the guiding device 3, such that a free end 6a (FIG. 6) of the wire 6 protrudes from the guiding element 4.

The free end 6a of the wire 6 is then immobilised in one of the gripper devices 13, 14, for example in the first gripper device 13.

Figure 10:
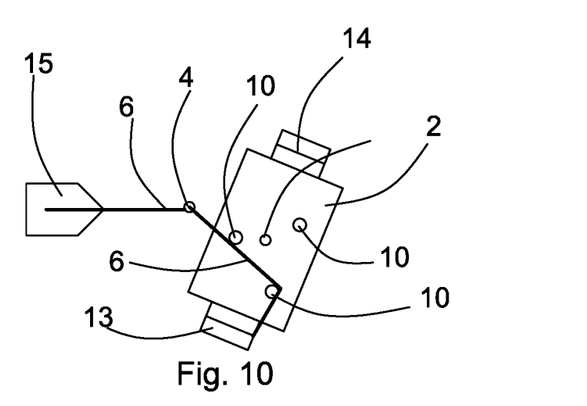
Figure 11:
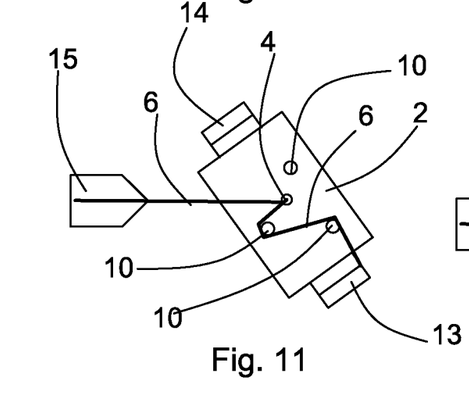
Figure 12:
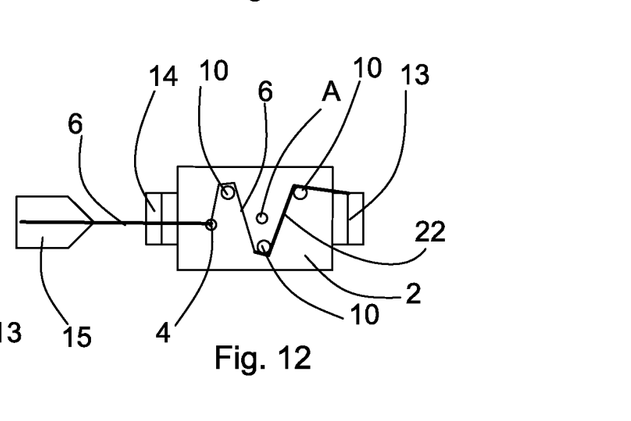

After the free end 6a of the wire has been immobilised, rotation of the forming device 2 around the rotation axis A (FIG. 8) is started and simultaneously the guiding device 3 is advanced in the direction of the arrow F1 to the forming device 2 until the wire 6 rests on a first shaping element 10 (FIG. 9) that protrudes from the guiding plate 11. The body 3a of the guiding device 3 is inserted into the space H, with the guiding element 4 that protrudes beyond the ends of the shaping elements 10 to the forming device 2. This enables the wire 6 to rest on the shaping elements 10 without the body 3a of the guiding element 3 interfering with the shaping elements. Subsequently, the rotation device continues rotating, while the guiding device 3 is made to go back in the direction of the arrow F1, but in the opposite direction to the preceding one, such that the wire 6 winds around the first shaping element 10 and comes into contact with a second shaping element 10 (FIG. 10). At this point, while rotation of the forming device 2 continues, the guiding device 3 is again advanced in such a manner that the wire 6 winds around the second shaping element 10 (FIG. 11). Lastly, the guiding device 3 is again made to go back, in such a manner as to emerge completely from the space H while the forming device 2 continues rotating until it reaches a portion rotated by 180° with respect to the initial position, in which the wire 6 is wound around the third forming element 10 completing formation of the antenna 22, and is inserted between the fixed jaw 16 and the movable jaw 17 of the second gripper device 14.

At this point, the movable jaw 17 of the second gripper is rotated in the closed position such that the cutting element 21 cuts the wire 6, separating the antenna 22 formed by the rest of the wire and retaining the free end 6a of the wire protruding from the guiding element 4.

While the second gripper device 14 closes, the substrate S is pushed against the guiding plate 11, pushing the shaping elements 10 upwardly and pushing the supporting plate 9 upwardly, overcoming the elastic force of the elastic thrust elements, or the weight of the supporting plate 9. While the substrate S comes into contact with the guiding plate 11, the antenna 22 comes into contact with the substrate S, on which an adhesive substance is spread, which makes the antenna 22 adhere to the substrate S, while the first gripper device 13 opens to free the antenna.

Lastly, the substrate S is removed from the forming device 2, which can start forming a subsequent antenna 22, repeating the movements disclosed above.

The substrate S can be pushed against the guiding plate 11 moving the substrate S upwards, or moving the forming device 2 downwards.

It should be noted that positioning of the wire to start forming of the subsequent antenna occurs automatically at the end of formation of the preceding antenna when the second gripper device 14 has closed, cutting the wire 6 and retaining the free end 6a of the wire. The two gripper devices 13 and 14 alternately retain the free end 6a of the wire during formation of the antennas. In other words, the gripper device that retains the free end 6a of the wire changes with each formation of a new antenna 22. Only at the start of the forming cycle of the antennas, i.e. when the first antenna has to be formed, is the free end 6a of the wire 6 manually immobilised in one of the gripper elements.

Figures 15, 16, 17:
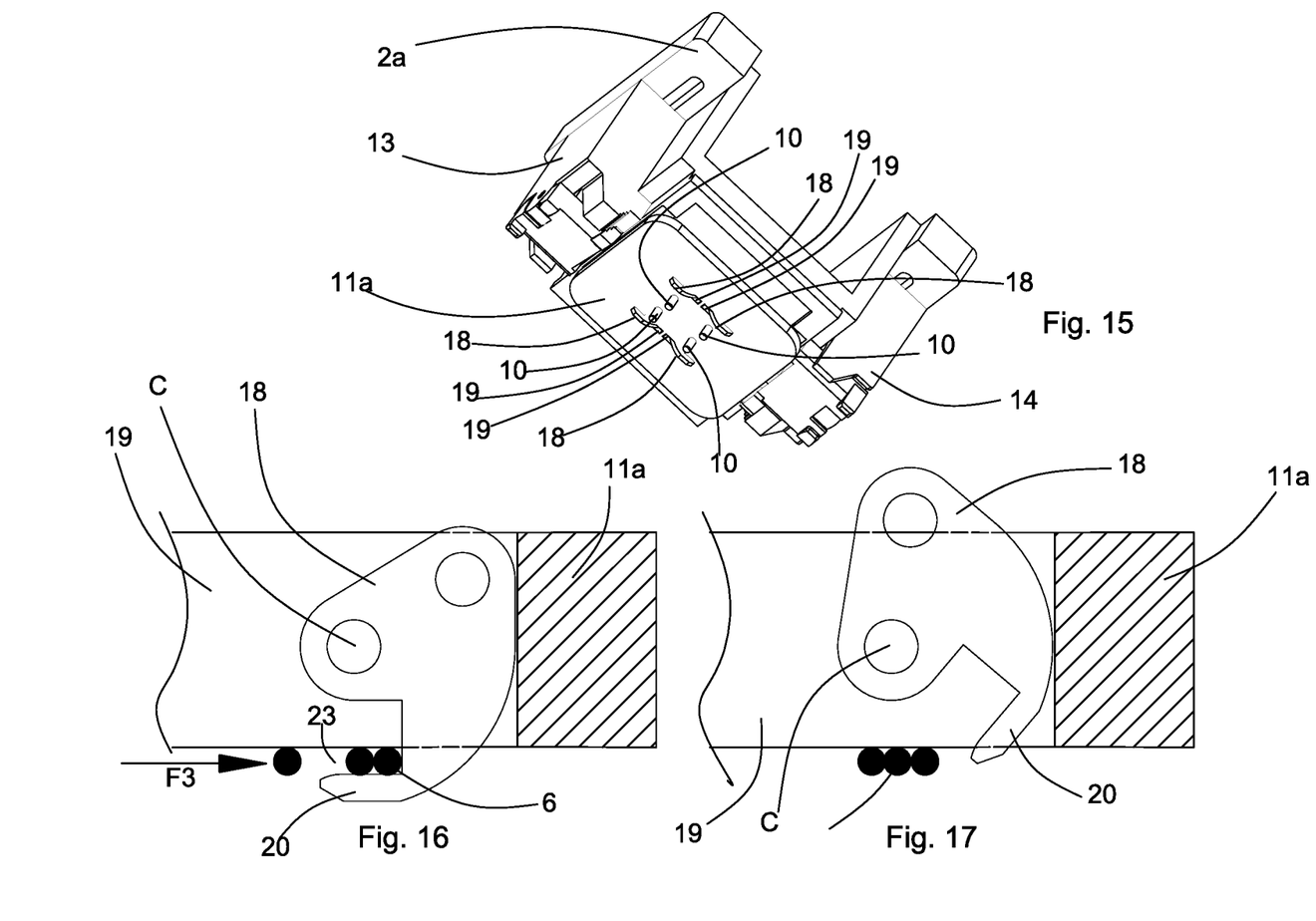
FIG. 15 is a perspective partial view from the bottom of a forming device which is suitable for making spiral antennas for HF RFID transponders.
FIG. 16 illustrates an immobilising device of the forming device of FIG. 15 for immobilising the electrically conductive wire that forms the antenna, the immobilising device being in closed position.
FIG. 17 illustrates the immobilising device in an open position.

In FIGS. 15, 16 and 17 a forming device 2a is illustrated that constitutes a version of the forming device 2 illustrated in FIGS. 1 to 14.

The forming device 2a is used to make spiral-shaped antennas for HF RFID transponders.

The forming device 2a includes a guiding plate 11a that is used to guide the shaping elements 10 when the plate 9 to which the shaping elements 10 are connected moves parallel to the rotation axis A.

The shaping elements 10 in this embodiment are four in number and are arranged at the vertices of a rectangle in order to define, during forming of the antenna, the four sides of the spiral shape of the antenna.

In the guiding plate 11a, four slits 19 are made through each of which a respective locking element 18 protrudes that can rotate around a respective rotation axis C between an operating position illustrated in FIG. 16 and a non-operating position illustrated in FIG. 17. Each locking element 18 includes a tooth or projection 20 to maintain the wire 6 immobilised against the surface of the guiding plate 11a during formation of the antenna when the locking element 18 is in the operating position. In this position, between the tooth 20 and the surface of the guiding plate 11a, a space 23 is defined that is dimensioned to enable the wire 6 to be inserted into the space 23 with minimum clearance along the direction indicated by the arrow F3, such that the wire 6 can be retained in the space 23 by the tooth 20 until the locking element 18 is rotated in the non-operating position. This occurs when the substrate S on which the formed antenna has to be placed is brought into contact with the guiding plate 11a and the wire 6, shaped as a spiral antenna, comes into contact with the surface of the substrate S to which it adheres.

The antenna is formed in the same manner as disclosed with reference to FIGS. 1 to 14 by rotating the forming device 2a around the rotation axis A and moving the guiding device 3 along the direction identified by the double arrow F1 such that the wire 6 winds in a spiral formation around the shaping elements 10 as described above with reference to FIGS. 1 to 14.

It should be noted that the locking elements 18 act as further shaping elements so that the turns of the antenna can be arranged in a compact formation, as can be seen in FIGS. 16 and 17.

Figure 18:
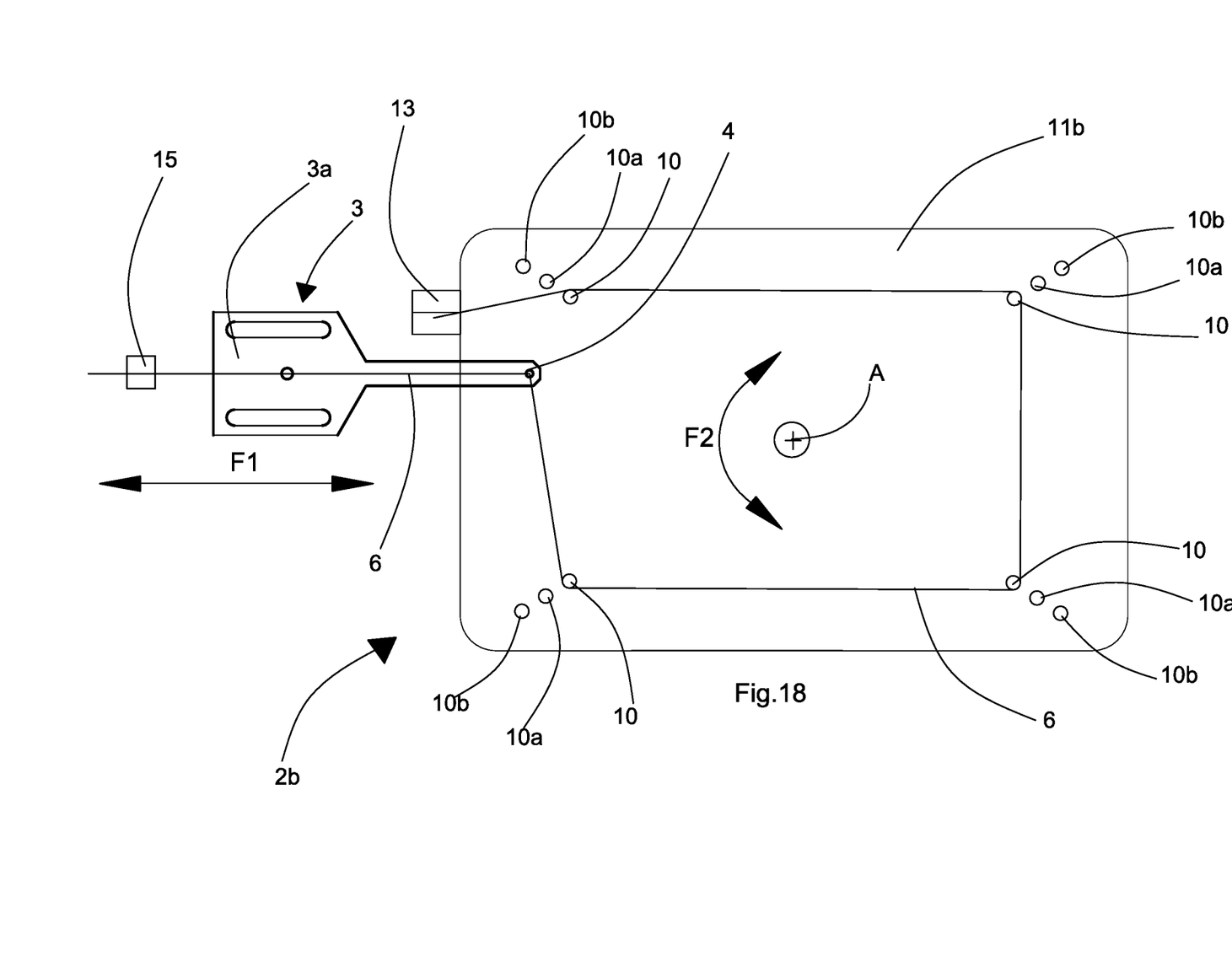
FIG. 18 is a schematic bottom view of a further version of the forming device for forming the antenna which is also suitable for making spiral antennas for HF RFID transponders.

In FIG. 18 a forming device 2b is illustrated that constitutes a further version of the forming device according to the invention.

The forming device 2b includes a guiding plate 11b, that is used to guide the shaping elements 10, 10a, 10b when the plate 9 to which the shaping elements 10, 10a, 10b are connected moves parallel to the rotation axis A.

In this embodiment, the shaping elements 10, 10a, 10b are arranged in groups at the vertices of a rectangle. In each vertex of the rectangle, each of said the groups includes a plurality of shaping elements 10, 10a, 10b arranged substantially aligned in the direction of a diagonal of the rectangle that terminates in the vertex. The number of shaping elements 10, 10a, 10b in each group can be any number, each group preferably including three shaping elements 10, 10a, 10b.

During formation of the antenna, the groups of shaping elements 10, 10a, 10b define the four sides of the spiral shape of the antenna.

The antenna is formed in an identical manner to what is disclosed with reference to FIGS. 1 to 17 by rotation of the forming device 2b around the rotation axis A and by movement of the guiding device 3 along the direction identified by the double arrow F1, such that the wire 6 winds in a spiral formation around the shaping elements 10, 10a, 10b. Initially, the guiding device 3 is inserted into the space H and moved towards the inside of the aforesaid rectangle, such that the wire 6, during rotation of the forming device 2b, is wound on the innermost shaping elements 10 of each group of shaping elements 10, 10a, 10b to make the first turn of the spiral configuration of the antenna.

After the first turn of the spiral configuration of the antenna, the guiding device 3 is moved outside the rectangle such that the wire 6 can be wound on the shaping elements 10a immediately adjacent to the innermost shaping elements 10 of each group 10, 10a, 10b, to complete a second turn of the spiral formation of the antenna.

After the second turn of the antenna is completed, the guiding device 3 moves further to the exterior to make a further turn of the antenna, until the guiding device 3 reaches a position that enables the wire 6 to wind around the outermost shaping elements 10b of each group of shaping elements, such as to make the last turn of the antenna and complete formation of the antenna.

The invention claimed is:

1. Apparatus for making a wire antenna for a radio-frequency identifying device, comprising:
   (a) a forming device including shaping elements for shaping a wire to form a wire antenna of a predetermined shape, said forming device being rotatable about a rotation axis and said shaping elements being movable in a direction parallel to said rotation axis;
   (b) a guiding device including a guiding element for guiding the wire, said guiding device being movable in at least one direction perpendicular to said rotation axis to guide the wire relative to said shaping elements of said forming device; and
   (c) at least one gripper device connected with said forming device for immobilizing a free end of the wire, whereby movement of said forming device, said shaping elements and said guiding device forms the wire into the antenna having the predetermined shape.

2. The apparatus as defined in claim 1, wherein said guiding element protrudes from a body of said, guiding device.

3. The apparatus as defined in claim 1, wherein said forming device includes a supporting plate which is movable in a direction parallel to said rotation axis, said shaping elements being connected with said supporting plate.

4. The apparatus as defined in claim 3, wherein said forming device includes a guiding plate which contains a plurality of guiding holes for guiding said shaping elements while said supporting plate moves along said direction parallel to said rotation axis.

5. The apparatus as defined in claim 4, wherein said guiding plate contains a plurality of slits, said forming device farther comprising a plurality of locking elements each which protrudes through one of said slits, respectively, each of said locking elements rotating around a respective rotation axis between an operating position and a non-operating position.

6. The apparatus as defined in claim 5, wherein each of said locking elements includes a projection which defines a space between said projection and said guiding plate when said locking elements are in the operating position, said space receiving the wire with minimum clearance and said projection retaining the wire in said space when said locking element is in the operating position.

7. The apparatus as defined in claim 1, wherein first and second gripper devices are connected with opposite sides of said forming device.

8. The apparatus as defined in claim 7, wherein at least one of said first and second gripper devices includes a cutting element.

9. The apparatus as defined in claim 1, wherein said forming device includes a connected flange for connecting said forming device with a drive assembly to rotate said forming apparatus.

10. The apparatus as defined in claim 1, wherein said shaping elements are arranged at the vertices of a rectangle.

11. The apparatus as defined in claim 10, wherein said shaping elements are arranged in groups at the vertices of the rectangle, each of said groups including a plurality of said shaping elements aligned in a direction of a diagonal of the rectangle that ends in a vertex.

12. A method for making a wire antenna for a radio-frequency identifying device, comprising the steps of:
(a) providing a forming device with a plurality of wire shaping elements;
(b) rotating said forming device around a rotation axis;
(c) moving said wire shaping elements in a direction parallel to said rotation axis;
(d) guiding a wire with a guiding element connected with a guiding device, said guiding device being movable along a direction perpendicular to said rotation axis to guide the wire through said shaping elements without said guiding device interfering with said shaping elements to form a wire antenna in a predetermined configuration; and
(e) moving a substrate into contact with the forming device to lay the antenna on a surface of the substrate; and
(f) connecting the antenna with the substrate.

13. A The method as defined in claim 12, and further comprising a step of gripping said wire with a first gripping device connected with said forming device tension the wire during formation of the antenna.

14. A The method as defined in claim 13, and further comprising a step of alternately gripping the wire with a second gripping device connected with said forming device and with the first gripping device to alternately tension the wire during formation of the antenna.

15. The method as defined in claim 12, and further comprising a step of locking the wire in selected locations with respect to a guiding device using rotatable locking devices protruding from said guiding device.

* * * * *